United States Patent
Schwartz et al.

(10) Patent No.: US 6,527,850 B2
(45) Date of Patent: Mar. 4, 2003

(54) USE OF COMB-BRANCHED COPOLYMERS IN GYPSUM COMPOSITIONS

(75) Inventors: Steven A. Schwartz, Downingtown, PA (US); Mohamad A. Dehyar, Lansdowne, PA (US)

(73) Assignee: Arco Chemical Technology L.P., Greenville, DE (US)

( * ) Notice: Subject to any disclaimer, the term of this patent is extended or adjusted under 35 U.S.C. 154(b) by 0 days.

(21) Appl. No.: 09/832,646

(22) Filed: Apr. 11, 2001

(65) Prior Publication Data

US 2003/0019401 A1 Jan. 30, 2003

(51) Int. Cl.⁷ .............................................. C04B 24/24
(52) U.S. Cl. ..................... 106/772; 106/778; 52/443; 52/449
(58) Field of Search ................................. 106/772, 778; 52/443, 449

(56) References Cited

U.S. PATENT DOCUMENTS

| | | |
|---|---|---|
| 4,561,986 A | 12/1985 | Villa et al. |
| 4,927,463 A | 5/1990 | Kloetzer et al. |
| 5,118,751 A | 6/1992 | Schulze et al. |
| 5,286,412 A | 2/1994 | Northey et al. |
| 5,614,017 A | 3/1997 | Shawl |
| 5,670,578 A | 9/1997 | Shawl |
| 5,879,446 A | 3/1999 | Patel et al. |
| 5,985,989 A | 11/1999 | Shawl et al. |
| 5,990,232 A | 11/1999 | Shen et al. |
| 6,034,208 A | 3/2000 | McDaniel et al. |

FOREIGN PATENT DOCUMENTS

| | | |
|---|---|---|
| DE | 32 03 067 A1 | 8/1982 |
| EP | 0 339 310 A1 | 4/1989 |
| JP | 60 260459 | 12/1985 |
| JP | 6 206749 | 7/1994 |
| JP | 8 217507 | 8/1996 |
| WO | WO01/07494 A1 | 2/2001 |

*Primary Examiner*—Paul Marcantoni
(74) *Attorney, Agent, or Firm*—Brooks & Kushman P.C.

(57) ABSTRACT

A gypsum composition suitable for use in the manufacture of construction materials is provided. The gypsum composition includes gypsum, water, and a dispersant formulation comprising an acrylic/polyether comb-branched copolymer. A method of making a gypsum composition is also provided. The method includes mixing together, in any combination, gypsum, water, and a dispersant formulation comprising an acrylic/polyether comb-branched copolymer. A wallboard is provided including two sheets of board paper, and a gypsum core between the sheets of board paper.

22 Claims, No Drawings

USE OF COMB-BRANCHED COPOLYMERS IN GYPSUM COMPOSITIONS

BACKGROUND OF THE INVENTION

1. Field of the Invention

The present invention relates generally to gypsum compositions for making gypsum containing materials, such as, "wallboard" and "drywall," and is also directed to improved methods for making gypsum compositions.

2. Background Art

One of the most common materials used in the construction of walls and barriers is gypsum wallboard, sometimes referred to as "drywall," or "plaster board." Wallboard is conventionally produced by sandwiching a core containing an aqueous slurry of calcium sulfate hemihydrate between two sheets of board cover paper. Calcium sulfate hemihydrate is also known as stucco and gypsum. From hereafter, the term "gypsum", unless specifically stated otherwise, will be understood to include calcium sulfate hemihydrate, calcined gypsum, stucco and gypsum. Wallboard is typically manufactured commercially by processes that are capable of operating under continuous high speed conditions, wherein the aqueous slurry of gypsum and other wallboard ingredients are continuously deposited to form a core between two continuously supplied moving sheets of cover paper. Various types of suitable cover paper are known in the art.

The gypsum slurry forming the core between the two cover sheets is then allowed to set (react with water to form calcium sulfate dihydrate). The continuously-produced board may then be cut into panels of a desired length (for example, eight feet). The formed board contains an excess of water because more water is required for working properties (to achieve a desired flow or consistency) during gypsum slurry preparation than is necessary for hydration of the gypsum. The boards are then passed through a drying kiln in which excess water is removed and the gypsum is brought to a final dry state. After the core has set and is dried, the sandwich becomes a strong, rigid, fire-resistant gypsum wallboard.

Other methods for the production of gypsum wallboard are described, for example, in the Kirk-Othmer Encyclopedia of Chemical Technology, Vol. 21, pages 621–24 (Second Edition 1970) and Vol. 4, pages 618–19 (Fourth Edition 1992), and U.S. Pat. No. 5,879,446 the disclosures of which are hereby incorporated herein by reference.

Gypsum is commonly manufactured by drying, grinding, and calcining natural gypsum rock. The drying step of gypsum manufacture includes passing crude gypsum rock through a rotary kiln to remove any free moisture accumulated in the rock from rain or snow, for example. The dried rock is then passed through a roller mill (a type of pulverizer), wherein the rock is ground to a desired fineness. The dried, ground gypsum is also known to as "land plaster."

The calcination step is performed by heating the ground gypsum rock, and is described by the following chemical equation:

$$CaSO_4 \cdot 2H_2O + heat \rightarrow CaSO_4 \cdot \tfrac{1}{2}H_2O + \tfrac{3}{2}H_2O$$

This chemical equation shows that calcium sulfate dihydrate plus heat yields gypsum (calcium sulfate hemihydrate) plus water vapor. This process is conducted in a "calciner," of which there are several types known in the art. Various methods of producing gypsum are known in the art.

Gypsum is chemically reactive with water, and will "set" rather quickly when the two are mixed together. This setting reaction is a reversal of the above-described chemical reaction performed during the calcination step. The reaction proceeds according to the following equation:

$$CaSO_4 \cdot \tfrac{1}{2}H_2O + \tfrac{3}{2}H_2O \rightarrow CaSO_4 \cdot 2H_2O + heat$$

In this reaction, the gypsum is rehydrated to its dihydrate state over a fairly short period of time. The actual time required for this setting reaction is generally dependent upon the type of calciner employed and the type of gypsum rock that is used and can be controlled within certain limits by the use of additives such as accelerators and retarders.

In the hydration reaction, hemihydrate gypsum is mixed with water until a suspension is formed that is fluid and workable. The hemihydrate gypsum dissolves until it forms a saturated solution. This saturated solution of hemihydrate is supersaturated with respect to dihydrate gypsum, and so the latter crystallizes out of the solution at suitable nucleation sites. Finally, as the dihydrate gypsum precipitates, the solution is no longer saturated with hemihydrate gypsum, so the hemihydrate gypsum continues to dissolve. Thus the process continues to consume the hemihydrate gypsum. The reaction can be followed by measuring the heat evolved. Initially there is very little reaction and no rise in temperature. This time is referred to as the induction period. As the amount of dihydrate gypsum increases, the mass thickness increases and the material hardens (sets).

In order to facilitate the above reaction and/or provide beneficial properties to the final product, various additives may also be included in the core gypsum slurry. For example, starch, set accelerators and/or set retarders, preservatives, and fiberglass may be included.

As described above, the setting reaction for gypsum involves the reaction of calcium sulfate hemihydrate with water to form calcium sulfate dihydrate. The theoretical (stoichiometric) water content of the slurry required for the reaction of calcium sulfate hemihydrate is about 18.7 weight percent. However, a large amount of water is generally required to provide sufficient fluidity of the calcined gypsum slurry in order to obtain proper flow of the gypsum slurry in the manufacturing process. The amount of water required to provide proper fluidity depends upon various factors, such as the type of gypsum, particle size distribution, the various phases of gypsum in the stucco, source, and the levels of above-described additives conventionally used in minor amounts. This level (amount) of water may be expressed quantitatively as the "consistency". Consistency is defined as the volume of water required to produce a desired fluidity (flow) for 100 g of gypsum.

Alpha-type gypsum generally requires a consistency of about 34 to about 45 ml of water per 100 grams of gypsum in order to form a readily pourable and flowable gypsum slurry. Beta-type gypsum, on the other hand, typically requires a consistency of about 65 to about 75 ml of water per 100 grams of gypsum.

Certain "water reducing," "fluidity," or "consistency-decreasing," additives/agents have been used in order to improve the fluidity of the above-described gypsum slurry while allowing use of reduced levels of water. Reduction in water usage brings reduced costs in the form of reduced water and energy demands, as less water will have to be removed during the drying step(s). Reduction of water usage also provides environmental benefits.

Various commercially-available fluidity-enhancing, consistency-decreasing, and/or water-reducing agents, i.e., dispersion agents, are known in the art for various applications. Typically, the dispersion agents used in gypsum wallboard manufacturing processes are calcium lignosulfonate, ammonium lignosulfonate, sodium lignosulfonate, and naphthalene sulfonate. The use of condensation products of naphthalene sulfonic acid and formaldehyde is also known. See also U.S. Pat. No. 4,184,887, the disclosure of which is hereby incorporated herein by reference. Calcium lignosulfonate, ammonium lignosulfonate, and sodium lignosulfonate are believed to provide the ability to use reduced water levels, but they retard the set times of gypsum in the hydration reaction discussed above. Setting can be discussed in terms of the "initial" and the "final" set times. The initial set time corresponds to the time at which hydration reaction (setting) begins, while the final set time is the time at which the hydration reaction is completed.

Accordingly, it would be advantageous to provide a gypsum wallboard manufacturing process that employs the use of a consistency-decreasing additive without producing the deleterious set retarding effects found in the prior art. Moreover, it would also be further desirable to provide a gypsum wallboard manufacturing process using a consistency-decreasing additive that improves the setting of the gypsum composition.

SUMMARY OF THE INVENTION

It has now been surprisingly discovered that the consistency of gypsum compositions can be decreased by incorporating into the gypsum composition a dispersant formulation comprising an acrylic/polyether comb-branched copolymer.

It has been further surprisingly discovered that gypsum compositions having a dispersant formulation comprising acrylic/polyether comb-branched copolymer, sodium sulfate, and calcium hydroxide have low consistency and excellent initial set rates.

Accordingly, the present invention comprises a gypsum composition suitable for use in the manufacture of construction materials. The gypsum composition includes: a) gypsum; b) water; and c) a dispersant formulation comprising an acrylic/polyether comb-branched copolymer.

Moreover, the present invention comprises a method of making a gypsum composition suitable for use in the manufacture of construction materials. The method includes mixing together, in any combination: a) gypsum; b) water; and c) a dispersant formulation comprising an acrylic/polyether comb-branched copolymer.

Furthermore, the present invention comprises a wallboard including two sheets of board paper and a gypsum core between the sheets of board paper. The gypsum core is made from the gypsum composition described above.

DETAILED DESCRIPTION OF THE PREFERRED EMBODIMENT(S)

Gypsum compositions made in accordance with the present invention comprise, at a minimum gypsum, water, and a dispersant formulation comprising an acrylic/polyether comb-branched copolymer.

The gypsum is preferably present in the gypsum compositions of the present invention in an amount of about 40 to about 75 weight percent, based on the weight of the gypsum composition, and more preferably about 50 to about 68 weight percent, and most preferably about 55 to about 65 weight percent. Preferably, the beta-hemihydrate form of gypsum is used with the invention. A preferred gypsum is available from the National Gypsum Corporation Research Center in Buffalo, N.Y.

The gypsum can be produced by a dry calcination method, such as kettle, calcidyne, holoflyte, rotary kiln, impmill, or caludis peter calcination. Dry gypsum has a higher surface area than that produced by autoclave calcination (steam calcination). Gypsums produced by dry calcination methods have high surface energy, so they are generally more reactive than those produced by autoclave calcination. Because of high surface area, these gypsums require four to five times more water to produce a fluid slurry.

Calcium sulfate (gypsum) is described in the Kirk-Othmer Encyclopedia of Chemical Technology, Vol. 4, pages 812–26 (Fourth Edition 1992), and U.S. Pat. Nos. 6,171,388 and 5,879,446, the disclosures of which are hereby incorporated herein by reference.

The water is preferably present in the gypsum composition of the present invention in amount of about 25 to about 60 weight percent, based on the total weight of the gypsum composition, more preferably in an amount of about 32 to about 50 weight percent, and most preferably in an amount of about 35 to about 45 weight percent.

In a first embodiment, the dispersant formulation comprises water and an acrylic/polyether comb-branched copolymer. The gypsum composition of the present invention preferably comprises the dispersant formulation in an amount effective to decrease the consistency of the gypsum composition relative to the consistency of a similar gypsum composition not containing the effective amount of the dispersant formulation.

In a second embodiment, the dispersant formulation comprises water, an acrylic/polyether comb-branched copolymer, and at least one inorganic setting accelerant. Preferably, two or more different inorganic setting accelerants are present in the dispersant formulation of the second embodiment. Preferably, the inorganic setting accelerant component comprises an alkali metal sulfate, an alkali earth metal hydroxide, or a combination thereof. Most preferably, the inorganic setting accelerant component comprises both sodium sulfate and calcium hydroxide.

Preferably, the dispersant formulation of the second embodiment is present in the gypsum composition in an amount effective to decrease the consistency and the set time of gypsum compositions relative to the consistency and initial set time of gypsum compositions not containing the effective amount of the dispersant formulation of the second embodiment. When referring to set time in these instances, we are more specifically referring to the initial set time. This period relates to the hardening of the gypsum slurry during wallboard manufacturing so that the core material between the two cover sheets is sufficiently brittle at the knife (for trimming) prior to entering the kiln for final set and drying.

In the first and second embodiments, the copolymer is preferably present in the dispersant formulation in an amount of about 0.001 to about 1.0 weight percent, based on the total weight of the gypsum in the gypsum composition, more preferably in an amount of about 0.05 to about 0.8 weight percent, and most preferably in an amount of about 0.1 to about 0.5 weight percent.

In the second embodiment, the inorganic setting accelerant component is present in an amount effective to decrease the initial set time of the gypsum composition. More preferably, the inorganic setting accelerant component is present in the dispersant formulation an amount of about 0.0001 to about 7 weight percent, based on the total weight of the gypsum in the gypsum composition, more preferably in an amount of about 0.1 to about 5 weight percent, and most preferably in an amount of about 0.1 to 3 weight percent.

When the inorganic setting accelerant component comprises sodium sulfate, the sodium sulfate is present in the dispersant formulation in an amount of about 0.01 to about 5 weight percent, based on the total weight of the gypsum in the gypsum composition, more preferably in an amount of about 0.1 to about 3 weight percent, and most preferably in an amount of about 0.5 to about 2 weight percent.

When the inorganic setting accelerant component comprises calcium hydroxide, the calcium hydroxide is present in the dispersant formulation in an amount of about 0.0001 to about 0.05 weight percent, based on the total weight of the gypsum in the gypsum composition, more preferably in an amount of about 0.001 to about 0.02 weight percent, and most preferably in an amount of about 0.001 to about 0.01 weight percent.

In a third embodiment, a portion of the acrylic/polyether comb-branched copolymer in the dispersant formulation of the first and second embodiments can be replaced with commercially known fluidity agents, such as calcium-based lignosulfonate and naphthalene sulfonate. In these instances, from about 30 to about 80 weight percent of the copolymer, based on the total weight of the copolymer, may be replaced with one or more of these commercially known fluidity agents, more preferably from about 35 to about 75 weight percent, and most preferably from about 40 to about 60 weight percent. The combination of the copolymer and the commercially known additives in the dispersant formulation can reduce the amount of copolymer needed.

In each of the three embodiments, it is preferred that the comb-branched copolymer be fully or partially neutralized so that the pH of the dispersant formulation is between about 2.0 and 14, more preferably between about 3 and 12.5, even more preferably between about 7 and 12, and most preferably between about 9 and 12. The pH of the comb-branched copolymer can be neutralized by the addition of any suitable base to the dispersant formulation. Examples of suitable bases include, but are not limited to, sodium hydroxide, potassium hydroxide (alkali metal), calcium hydroxide (alkaline earth metal), ammonia, alkyl amines as such as triethanolamine, diethanolamine, triisopropanolamine or the like (ammonium or organic amines) with the most preferred base being sodium hydroxide.

The dispersant formulations of the first, second and third embodiments are each prepared by mixing the components at or about room temperature using conventional mixing equipment. A preferred procedure for preparing a dispersant formulation of the present invention is as follows: the desired levels of the acrylic/polyether comb-branched copolymer (or the combination of the acrylic/polyether comb-branched copolymer and the commercially known fluidity agents) are diluted in water. If desired, full or partial neutralization is then achieved by addition of sodium hydroxide until the desired pH is reached. Another preferred procedure for preparing a dispersant formulation of the present invention is as follows: the desired levels of the acrylic/polyether comb-branched copolymer (or the combination of the acrylic/polyether comb-branched copolymer and the commercially known fluidity agents) are diluted in water. If desired, full or partial neutralization is then achieved by addition of a 50 wt. % aqueous solution of sodium hydroxide until the desired pH is reached. This is followed by the addition of sodium sulfate and calcium hydroxide. It should be noted that the sodium sulfate and the calcium hydroxide are only soluble in the dispersant formulation at the desired concentrations in the presence of the acrylic/polyether comb-branched copolymer that is the subject of this invention.

The acrylic/polyether comb-branched copolymer preferably has a molecular weight of 400 grams per mole to about 500,000 grams per mole, more preferably between about 600 grams per mole to about 400,000 grams per mole, and most preferably between about 1,000 grams per mole to about 100,000 grams per mole. The copolymer preferably has a mole ratio of acrylic monomer units to polyether units of about 1/99 to about 99/1, more preferably from about 1/1 to about 20/1, and most preferably from about 4/1 to about 20/1.

The comb-branched copolymer can be made by any suitable process for copolymerizing acrylic units with polyether units. In one preferred method, the copolymer is formed by reacting a polyether polymer or macromonomer with a polyacrylic acid polymer or acrylic monomer. The process may be continuous, batch, or semi-batch. Following the copolymerization process, any relatively volatile unreacted monomers are generally stripped from the product.

More preferably, the comb-branched copolymer is made according to a process selected from the group consisting of (i) copolymerizing an unsaturated polyether macromonomer with at least one ethylenically unsaturated comonomer selected from the group consisting of carboxylic acids, carboxylic acid salts, hydroxyalkyl esters of carboxylic acids, and carboxylic acid anhydrides, and (ii) reacting a carboxylic acid polymer and (a) a polyether prepared by polymerizing a $C_2$–$C_4$ epoxide or (b) a polyether mixture comprising (1) a monofunctional polyether prepared by polymerizing a first epoxide selected from the group consisting of $C_2$–$C_4$ epoxides and mixtures thereof onto a monofunctional initiator and (2) a difunctional polyether prepared by polymerizing a second epoxide selected from the group consisting of $C_2$–$C_4$ epoxides and mixtures thereof, which may be the same as or different from the first epoxide, onto a difunctional initiator wherein the carboxylic acid polymer and the polyethers are reacted under conditions effective to achieve partial cleavage of the polyether and esterification of the polyether and cleavage products thereof by the carboxylic acid polymer, and (iii) polymerizing a polymerizable acid monomer containing at least one ethylenically unsaturated group in conjugation with a carboxyl group selected from the group consisting of carboxylic acid, carboxylic anhydride and carboxylic ester groups in a reaction medium comprising a polyether, wherein the polyether is prepared by polymerizing a $C_2$–$C_4$ epoxide, to form a carboxylic acid polymer; and reacting the carboxylic acid polymer and the polyether under conditions effective to achieve esterification of the polyether by the carboxylic acid polymer to form the comb-branched copolymer.

The preferred polyether macromonomer preferably comprises ethylene oxide and propylene oxide and has a molecular weight of about 300 grams per mole to about 100,000 grams per mole, more preferably between about 500 grams per mole to about 75,000 grams per mole, and most preferably between about 1,000 grams per mole to about 10,000 grams per mole. All molecular weights are number average molecular weights unless stated otherwise. Preferably, the ratio of propylene oxide (PO) to ethylene oxide (EO) of the polyether polymer or polyether macromonomer is preferably between about 99/1 to about 1/99, more preferably between about 80/20 to about 1/99, and most preferably between about 60/40 to about 1/99 by weight.

A preferred process for making the copolymer comprises: (a) forming a monomer stream, an initiator stream, and an optional chain transfer agent stream; (b) polymerizing the streams in a reaction zone at a temperature within the range of about −20° C. to about 150° C.; and (c) withdrawing a polymer stream from the reaction zone. This process is described in more detail in copending U.S. patent application Ser. No. 09/358,009, filed Jul. 21, 1999, which is incorporated herein by reference.

The monomer stream contains an acrylic monomer and a polyether macromonomer. Suitable acrylic monomers are derived from acrylic acid and methacrylic acid. Preferred acrylic monomers include acrylic acid, methacrylic acid, their ammonium and alkali metal salts, their $C_1$ to $C_{10}$ alkyl and $C_6$ to $C_{12}$ aryl esters, and their amides. Acrylic acid, methacrylic acid, ammonium acrylate, ammonium methacrylate, sodium acrylate, sodium methacrylate, potassium acrylate, and potassium methacrylate are preferred. Most preferred are acrylic acid and methacrylic acid.

Suitable polyether macromonomers have a polyether chain and a single carbon-carbon double bond, which can be located either terminally or within the polyether chain. Examples include polyether monoacrylates, polyether monomethacrylates, polyether monoallyl ethers, polyether monomaleates, and polyether monofumarates. Further examples include the reaction product of a hydroxyl-functional polyether with isocyanatoalkyl(meth)acrylates such as isocyanatoethylacrylate, and with ethylenically unsaturated aryl isocyanates. The polyether of the macromonomer is an alkylene oxide polymer having a number average molecular weight within the range of about 500 to about 10,000. Suitable alkylene oxides include ethylene oxide, propylene oxide, butylene oxide, and the like, and mixtures thereof. The polyether macromonomers preferably have hydroxyl functionality from 0 to 5. They can be either linear or branched polymers, homopolymers or copolymers, random or block copolymers, diblock or multiple-block copolymers.

Examples of polyether macromonomers are poly (propylene glycol) acrylates or methacrylates, poly(ethylene glycol) acrylates or methacrylates, poly(ethylene glycol) methyl ether acrylates or methacrylates, acrylates or methacrylates of an oxyethylene and oxypropylene block or random copolymer, poly(propylene glycol) allyl ether, poly (ethylene glycol) allyl ether, poly(propylene glycol) monomaleate, and the like, and mixtures thereof. Preferred polyether macromonomers are poly(propylene glycol) acrylates or methacrylates, poly(ethylene glycol) acrylates or methacrylates, acrylates or methacrylates of an oxyethylene and oxypropylene block and/or random copolymer. More preferred are acrylates or methacrylates of an oxyethylene and oxypropylene block and/or random copolymer.

The ratio of acrylic monomer to polyether macromonomer is determined by many factors within the skilled person's discretion, including the required physical properties of the comb-branched copolymer, the selection of the acrylic monomer, and the properties of the polyether macromonomer. The ratio generally is within the range from 1/99 to 99/1 by weight. The preferred range is from 5/95 to 75/25.

In one embodiment, the macromonomer is made by (a) oxyalkylating an initiator molecule selected from the group consisting of hydroxyalkyl acrylates, hydroxyalkyl methacrylates, and monounsaturated monocarboxylic acids with an alkylene oxide in the presence of an effective amount of a double metal cyanide complex catalyst under conditions effective to form a well-defined unsaturated macromonomer having a terminal hydroxyl functionality and not more than substantially one initiator molecule per unsaturated macromonomer molecule. This method is described in substantial detail in U.S. Pat. No. 6,034,208, which is incorporated herein by reference. Also, the macromonomer described in U.S. Pat. No. 6,034,208 in addition to being reacted in the manner described in the preferred continuous process described herein, can be reacted with the comonomer in the manner described in U.S. Pat. No. 6,034,208.

Optionally, the monomer stream contains a third monomer. The third monomer is preferably selected from vinyl aromatics, vinyl halides, vinyl ethers, vinyl esters, vinyl pyrrolidinones, conjugated dienes, unsaturated sulfonic acids, unsaturated phosphonic acids, and the like, and mixtures thereof. The amount of third monomer used depends on the required physical properties of the comb-branched copolymer product, but is preferably less than 50% by weight of the total amount of monomers.

Optionally, the monomer stream also includes a solvent. The solvent is used to dissolve the monomer, to assist heat transfer of the polymerization, or to reduce the viscosity of the final product. The solvent is preferably selected from water, alcohols, ethers, esters, ketones, aliphatic hydrocarbons, aromatic hydrocarbons, halides, and the like, and mixtures thereof. Selections of solvent type and amount are determined by the polymerization conditions including reaction temperature. Water and alcohols, such as methanol, ethanol, and isopropanol are preferred.

The initiator stream contains a free radical initiator. The initiator is preferably selected from persulfates, hydrogen peroxide, organic peroxides and hydroperoxides, azo compounds, and redox initiators such as hydrogen peroxide plus ferrous ion. Persulfates, such as ammonium and potassium persulfate, are preferred.

Optionally, the initiator stream contains a solvent. The solvent is used to dissolve or dilute the initiator, to control the polymerization rate, or to aid heat or mass transfer of the polymerization. Selections of solvent type and amount are determined by the nature of the initiator and the polymerization conditions. Water and alcohols such as methanol, ethanol, and isopropanol are preferred when persulfate is used as the initiator.

The monomer and initiator streams optionally include a chain transfer agent. Suitable chain transfer agents include alkyliodides and bromides, branched lower alcohols such as isopropanol, alkyl amines, alkyl sulfides, alkyl disulfides, carbon tetrahalides, allyl ethers, and mercaptans. Mercaptans, such as dodecyl mercaptan, butyl mercaptan, mercaptoacetic and mercaptopropionic acids, are preferred.

Under some conditions, it is preferred to add the chain transfer agent in a separate stream. This is particularly desirable when the chain transfer agent causes decomposition of the initiator or polymerization of the monomer once it is mixed with those components. This is particularly important in a large, commercial scale because these reactions can cause safety problems.

Optionally, the chain transfer agent stream contains a solvent that is used to dissolve or dilute the chain transfer agent. Suitable solvents include water, alcohols, ethers, esters, ketones, aliphatic and aromatic hydrocarbons, halides, and the like, and mixtures thereof. Selections of solvent type and amount are determined by the nature of the chain transfer agent and the polymerization conditions. Water and alcohols, such as methanol, ethanol, and isopropanol, are preferred.

The monomer stream, initiator stream, and optional chain transfer agent stream are polymerized in a reaction zone. The reaction temperature is preferably kept essentially constant during the polymerization. The temperature is determined by a combination of factors including the desired molecular weight of the comb-branched polymer product, the initiator type and concentration, the monomer type and concentration, and the solvent used. The reaction is performed at a temperature within the range of about −20° C. to about 150° C., preferably, within the range of about 20° C. to about 90° C. Most preferred is the range of about 40° C. to about 60° C.

The addition rate of each stream depends on the desired concentration of each component, the size and shape of the reaction zone, the reaction temperature, and many other considerations. In general, the streams flow into the reaction zone at rates that keep the initiator concentration within the range of about 0.01% to about 1% by weight, and the chain transfer agent concentration within the range of about 0.1% to about 1.5% by weight.

The reaction zone is where the polymerization takes place. It can be in the form of a tank reactor, a tubular reactor, or any other desirably shaped reactor. The reaction zone is preferably equipped with a mixer, a heat transfer device, an inert gas source, and any other suitable equipment.

As the streams are polymerized in the reaction zone, a polymer stream is withdrawn. The flow rate of the polymer stream is such that the reaction zone is mass-balanced, meaning that the amount of material that flows into the reaction zone is equal to the amount of material withdrawn from the reaction zone. The polymer stream is then collected.

The comb-branched copolymer may also be made according to a multiple-zone process. A multiple-zone process is similar to the process discussed above except that more than one reaction zone is used. In a multiple-zone process, a first polymer stream is withdrawn from a first reaction zone and transferred into a second reaction zone where the polymerization continues. A second polymer stream is withdrawn from the second reaction zone. More than two reaction zones can be used if desirable. The reaction temperature in the second reaction zone can be the same as or different from the first reaction zone. A multiple-zone process can enhance monomer conversion and increase efficiency of the process. Usually, in the first polymer stream, the monomer conversion is within the range of about 65% to 85% by weight. The second reaction zone preferably brings the monomer conversion to 90% or greater.

In a second preferred process, the comb-branched copolymer used in accordance with the present invention can be made by reacting (a) a carboxylic acid polymer and (b) a polyether macromonomer prepared by polymerizing a $C_2$–$C_4$ epoxide or (c) a polyether mixture comprising (1) a monofunctional polyether prepared by polymerizing a first epoxide selected from the group consisting of $C_2$–$C_4$ expoxides and mixtures thereof onto a monofunctional initiator and (2) a difunctional polyether prepared by polymerizing a second epoxide selected from the group consisting of $C_2$–$C_4$ epoxides and mixtures thereof, which may be the same as or different from the first epoxide, onto a difunctional initiator wherein the carboxylic acid polymer and the polyethers are reacted under conditions effective to achieve partial cleavage of the polyether and esterification of the polyether and cleavage products thereof by the carboxylic acid polymer. These methods are described in substantial detail in U.S. Pat. Nos. 5,614,017 and 5,670,578 which are incorporated herein by reference.

In a third preferred process, the comb-branched copolymer used in accordance with the present invention can be made by polymerizing a polymerizable acid monomer containing at least one ethylenically unsaturated group in conjugation with a carboxyl group selected from the group consisting of carboxylic acid, carboxylic anhydride and carboxylic ester groups in a reaction medium comprising a polyether, wherein the polyether is prepared by polymerizing a $C_2$–$C_4$ epoxide, to form a carboxylic acid polymer; and reacting the carboxylic acid polymer and the polyether under conditions effective to achieve esterification of the polyether by the carboxylic acid polymer to form the comb-branched copolymer. This method is described in substantial detail in U.S. Pat. No. 5, 985, 989 which is incorporated herein by reference Other dry ingredients may be included in the gypsum composition, including an accelerator which can be used to control, within certain limits, the crystal growth rate and set time of the stucco. Examples of suitable accelerators include ball mill accelerators ("BMA"), $CaCl_2$, $Na_2CO_3$, and $K_2SO_4$, although others are known to those of skill in the art. Usually, both potassium sulfate and ball mill accelerators are used.

An aqueous slurry or solution of paper pulp may also be included in the gypsum composition. The pulp solution comprises water and paper fibers ("paper pulp"), and may also include corn starch and/or potash.

A retarder optionally may be included in the paper pulp solution and is used in conjunction with the aforementioned accelerator in order to tailor the set time of the gypsum composition. Typically, retarders that may be used include sodium citrate, sodium phosphate and the like.

The gypsum compositions of the present invention are made by using conventional mixing equipment at room temperature to mix the components. Generally, the gypsum compositions are prepared by swiftly mixing the gypsum with an aqueous solution containing the dispersant formulation to form an aqueous slurry.

The wallboard can be made according to any known method as long as the dispersant formulation is added to the gypsum composition. One process for manufacturing the core composition and wallboard of the invention initially includes the premixing of dry ingredients in a mixing apparatus. The dry ingredients preferably include gypsum, an optional accelerator, and an antidesiccant (e.g., starch), as described below in greater detail. The dry ingredients are preferably mixed together with a "wet" (aqueous) portion of the core composition in a pin mixer apparatus.

The wet portion can include a first component (referred to as a "paper pulp solution") that includes a mixture of water, paper pulp, and the dispersant formulation of the present invention. A set retarder can be included. The paper pulp solution provides a major portion of the water that forms the gypsum slurry of the core composition. The water supplied in the wet portion of the composition should include sufficient water for the setting reaction of the gypsum, plus an additional amount to decrease the consistency of the slurry during the manufacturing process. A second wet component may include a mixture of foam and other conventional additives, if desired, foam, starch, surfactants, and glass fiber.

The pulp solution can be prepared by blending or mixing the above ingredients with water in a blending apparatus. Alternatively, a concentrated pulp solution using only a small volume of water can be produced. In this case, the remainder of the core mix water requirement is made up with a separate water source. Preferably, high shear mixing "pulps" the material, forming a homogenous solution or slurry. The pulp solution can be transferred to a holding vessel, from which it can be continuously added to the core composition mix. The paper fibers in the pulp solution serve to enhance the flexibility of the gypsum wallboard.

The produced core gypsum composition slurry is deposited between paper cover sheets to form a sandwich. The core gypsum composition is allowed to cure or set, whereby calcium sulfate hemihydrate (gypsum) is converted to calcium sulfate dihydrate. The product is then preferably dried by exposing the product to heat, in order to remove excess water not consumed in the reaction forming the calcium sulfate dihydrate.

The setting reaction produces gypsum crystals, which are interwoven to contribute strength to the wallboard core. The crystal-to-crystal interaction is important to the final strength of the gypsum wallboard product. The gypsum crystals also preferably interlock with paper fibers protruding from the surface or cover papers, thus bonding the papers to the core. This bonding or interaction also increases the strength of the wallboard product.

The use of the dispersant formulation of the present invention reduces the amount of water required to manufacture the wallboard. The alteration of the water-to-gypsum ratio may have several effects on the wallboard composition. First, a low water-to-gypsum ratio will generally decrease the porosity of the final board product, as the water present in the slurry will generally increase porosity in the final product. The lower water usage will increase the effect of the crystal growth during setting because available nucleating sites are concentrated into a smaller volume of the mix. Interaction of growing gypsum crystals occurs earlier and is more effective, and is therefore believed to provide improved strength in the final products of the invention.

Moreover, in general, strength properties are also increased by using less water to fluidize the gypsum slurry. The reduced drying requirement also provides the potential to increase line speed, providing a large commercial advantage of the invention.

The following examples merely illustrate the present invention. Those skilled in the art will recognize many variations that are within the spirit of the present invention and scope of the claims.

EXAMPLE 1

Preparation of Comb-Branched Copolymer By Continuous Process

A polyether macromonomer that is an acrylate of oxyethylene/oxypropylene random copolymer having oxyethylene/oxypropylene ratio 50/50 by weight and number average molecular weight $M_n$ of 2,000 (122.5g, 0.0613 mole) that is made in accordance with the process described in U.S. Pat. No. 6,034,208, acrylic acid (17.6 g, 0.245 mole), mercaptopropionic acid (1.2 g) and ammonium persulfate (0.70 g) are charged into a one-liter reactor. The reactor is equipped with a stirrer, a temperature controller, a heating coil, a nitrogen purge device, a monomer addition pump, an initiator addition pump, and a sample outlet. The reactor contents are purged with $N_2$ for 20 minutes. Additional polyether macromonomer (245 g, 0.123 mole), made in the same manner described above, acrylic acid (35.4 g, 0.492 mole), mercaptopropionic acid (2.6 g) and deionized water (DI water) (145 g) are then mixed. The mixture is purged with $N_2$ for 20 minutes and the charged into the monomer pump. Ammonium persulfate (1.4 g) is dissolved in DI water (153 g). The solution is purged with $N_2$ for 20 minutes and then charged into the initiator pump. The reactor contents are heated to 40° C. The monomer mixture and the initiator solution are continuously pumped into the reactor at the rates of 1.0 gram/min and 0.33 gram/min, respectively. The product is continuously withdrawn from the reactor rate of 1.33 gram/min. It has a number average molecular weight $M_n$: 23000, and molecular weight distribution $M_w/M_n$: 1.30.

EXAMPLE 2

Preparation of Comb-Branched Copolymer By Continuous Process

A polyether macromonomer that is an acrylate of oxyethylene/oxypropylene random copolymer having oxyethylene/oxypropylene ratio 75/25 by weight and number average molecular weight $M_n$ of 4,000 (122.5 g, 0.0306 mole) made in accordance with the process described in U.S. Pat. No. 6,034,208, acrylic acid (17.6 g, 0.245 mole), mercaptopropionic acid (1.2 g) and ammonium persulfate (0.70 g) are charged into a one-liter reactor. The reactor is equipped with a stirrer, a temperature controller, a heating coil, a nitrogen purge device, a monomer addition pump, an initiator addition pump, and a sample outlet. The reactor contents are purged with $N_2$ for 20 minutes. Additional polyether macromonomer (245 g, 0.061 mole), made in the same manner described above, acrylic acid (35.4 g, 0.492 mole), mercaptopropionic acid (2.6 g) and deionized water (DI water) (145 g) are mixed. The mixture is purged with $N_2$ for 20 minutes and the charged into the monomer pump. Ammonium persulfate (1.4 g) is dissolved in DI water (153 g). The solution is purged with $N_2$ for 20 minutes and then charged into the initiator pump. The reactor contents are heated to 40° C. The monomer mixture and the initiator solution are continuously pumped into the reactor at the rates of 1.0 gram/min and 0.33 gram/min, respectively. The product is continuously withdrawn from the reactor rate of 1.33 gram/min. It has a number average molecular weight $M_n$: 28000, and molecular weight distribution $M_w/M_n$: 1.42.

After withdrawing the polymer, a 50% solution (in water) of sodium hydroxide can be added to the polymer until a target pH ranging between 9 and 12 was achieved. For this particular example, this would require the addition of 7 to 28 g of a 50% aqueous solution of sodium hydroxide to 100 g of a 50% actives (aqueous) polymer solution.

EXAMPLE 3

The consistencies of various gypsum compositions containing various dispersant candidates were tested.

The gypsum compositions were tested in the following manner. The dispersing ability of the dispersant candidates was measured utilizing a water reduction test patterned after ASTM C472. The test is used to determine the amount of water that is required to produce a gypsum composition of a specific viscosity. The desired viscosity reflects the fluidity necessary to obtain proper flow of the gypsum slurry in the manufacturing process. This amount is called the "consistency," and it is defined as the volume of water required to produce the desired viscosity for 100 g of calcined gypsum ($CaSO_4 \cdot \frac{1}{2}H_2O$).

consistency=ml $H_2O$/100 g gypsum

Gypsum compositions were prepared by swiftly adding 50 g of the calcined gypsum into an 8 ounce expandable polystyrene cup containing either water alone or an aqueous solution containing the dissolved dispersant candidate. The gypsum composition was gently hand-agitated for 60 seconds using a ¾ inch metal spatula in order to provide uniform wetting of the calcined gypsum. This was immediately followed by more vigorous mixing, using the same spatula, for 30 seconds at a rate of about 160 strokes/minute.

Then, the gypsum composition was immediately poured out of the cup in one continuous motion from a height of 90 mm onto a clean, glass plate. The diameter of the resulting circular patty was then measured. The desired slurry viscosity for these experiments produced a test patty that measured 90 mm in diameter. The consistency was then calculated to be two-times the volume of water needed to produce this test patty diameter.

The gypsum (Beta-type $CaSO_4 \cdot \frac{1}{2}H_2O$) used for these measurements was obtained from National Gypsum Corporation Research Center in Buffalo, N.Y.

The various dispersant candidates comprised the copolymer dispersant of Examples 1 and 2 of the present invention (corresponding to the gypsum composition of the first embodiment); calcium-based lignosulfonate material (Lignosite CX, Georgia Pacific Corporation, Atlanta, Ga); and naphthalene sulfonate material (Diloflo GW, Geo Specialty Chemicals, Horsham, Pa). The latter two dispersant candidates are commercially available materials that are known in the art to be useful as dispersing agents for gypsum. The copolymer of example 2 has been neutralized to a pH of 11.8.

These tests were conducted at differing weight percents of dispersant candidates based on the weight of gypsum in the gypsum compositions. The results are shown in Table 1.

TABLE 1

| Wt. % Dispersant Candidate (on gypsum) | Dispersant Candidate: | | | |
|---|---|---|---|---|
| | Lignosite Cx | Diloflo GW | Co-polymer of Ex. 1 | Co-polymer of Ex. 2 |
| | Consistency (ml $H_2O$/100 g gypsum) | | | |
| 0 (No dispersant) | 81 | 81 | 81 | 81 |
| 0.10 | 73 | 78 | 74 | — |
| 0.15 | 73 | 77 | 70 | 70 |
| 0.20 | 73 | 74 | 68 | 66 |
| 0.25 | 72 | 74 | 67 | 62 |
| 0.30 | 71 | 74 | 65 | — |
| 0.35 | 70 | 73 | 65 | 57 |

As shown in Table 1, the gypsum compositions made with comb/branched copolymers of the present invention in the dispersant formulations show better fluidity (lower consistency) with increasing copolymer concentration than dispersant formulations containing either of the commercially available dispersing agents.

EXAMPLE 4

The consistency and initial set times of gypsum compositions containing the copolymer of Example 2 neutralized to a pH of about 11.8, alone (corresponds to first embodiment), and in combination with sodium sulfate and/or calcium hydroxide (corresponds to second embodiment) were tested. The initial set time determination is patterned after a procedure that is described in ASTM C266. The method involves preparing gypsum compositions in a manner essentially similar to the method previously described for determining consistency in Example 3. The only difference being, where applicable, is that the sulfate and/or hydroxide are(is) added to the aqueous solution. However, to test the initial set time, rather than pouring the gypsum composition out of the cup for measuring consistency, the cup remains upright on the lab benchtop. A 300 g mass, 1 mm diameter Vicat needle is then positioned normal to the exposed, top surface of the gypsum slurry and is allowed to repeatedly fall freely with the force of gravity. The initial set time is defined as the time when the Vicat needle stops penetrating the slurry. The results are shown in Table 2 below.

TABLE 2

| Ingredient | Gypsum Composition | | | | |
|---|---|---|---|---|---|
| | 1 | 2 | 3 | 4 | 5 |
| | Wt. % on Gypsum | | | | |
| Comb-Copolymer of Example 2 | 0.34 | 0.34 | 0.35 | 0.35 | 0 |
| $Na_2SO_4$ | 0 | 0 | 1.02 | 1.02 | 1.02 |
| $Ca(OH)_2$ | 0 | 0.014 | 0 | 0.007 | 0.007 |
| Consistency (ml $H_2O$/100 g gypsum) | 57 | 57 | 59 | 58 | 90 |
| Initial Set Time (seconds) | 497 | 470 | 360 | 307 | 155 |
| Stable | Yes | Yes | Yes | Yes | No |

As shown in Table 2, the combined presence of the comb/branched copolymer of Example 2 (having a pH of 11.8) and suitable levels of $Na_2SO_4$ and $Ca(OH)_2$ results in a stable dispersant formulation that together produces low consistency and low initial set time.

EXAMPLE 5

The consistency and initial set time of gypsum composition containing calcium lignosulfonate and the copolymer of Example 2 with sodium sulfate and calcium hydroxide at differing pH were compared. The experiment were conducted in a manner similar to the manner in which Example 4 was conducted. The pH was adjusted by the addition of NaOH as described in Example 2. The results are shown in Table 3 below.

TABLE 3

| Gypsum Composition Ingredient | 6 | 7 | 8 | 9 |
|---|---|---|---|---|
| | Wt. % on Gypsum | | | |
| Calcium Lignosulfonate (Lignosite CX) | 0 | 0 | 0 | 0.25 |
| Comb-Copolymer of Example 2 | 0.25 | 0.25 | 0.25 | 0 |
| $Na_2SO_4$ | 0.73 | 0.73 | 0 | 0 |
| $Ca(OH)_2$ | 0.005 | 0.005 | 0 | 0 |
| pH | 9.4 | 11.9 | 11.8 | 6.9 |
| Consistency (ml $H_2O$/100 g gypsum) | 63 | 62 | 62 | 72 |
| Initial Set Time (seconds) | 360 | 306 | 400 | 315 |

As can be seen from Table 3, the appropriate combination of comb/branched copolymer, $Na_2SO_4$, $Ca(OH)_2$, and NaOH results in both low consistency and low initial set time compared with a commercially available dispersing agent (calcium lignosulfonate) that is known to be useful in the art for gypsum.

EXAMPLE 6

The consistency of gypsum compositions of the third embodiment containing the commercially known additive, naphthalene sulfonate and blends of naphthalene sulfonate and the copolymer of Example 1 was tested. The experiments were conducted in a manner similar to the manner in which Example 3 was conducted. The results are shown in Table 4 below.

TABLE 4

| | Gypsum Composition | | | | | | | | |
|---|---|---|---|---|---|---|---|---|---|
| | 10 | 11 | 12 | 13 | 14 | 15 | 16 | 17 | 18 |
| Wt. % Naphthalene Sulfonate (on gypsum) | 0.15 | 0.20 | 0.15 | 0.25 | 0.15 | 0.30 | 0.15 | 0.35 | 0.15 |
| Wt. % Copolymer of Ex. 1 (on gypsum) | — | — | 0.05 | — | 0.10 | — | 0.15 | — | 0.20 |
| Total Wt. % Dispersant (on gypsum) | 0.15 | 0.20 | 0.20 | 0.25 | 0.25 | 0.30 | 0.30 | 0.35 | 0.35 |
| Consistency (ml H$_2$O/100 g gypsum) | 77 | 74 | 72 | 74 | 70 | 74 | 68 | 73 | 67 |

EXAMPLE 7

Example 7 is similar to Example 6 except that the naphthalene sulfonate was replaced with calcium lignosulfonate. The experiment was conducted in a manner similar to the manner in which Example 3 was conducted. The results are shown below in Table 5 below.

TABLE 5

| | Gypsum Composition | | | | | | | | |
|---|---|---|---|---|---|---|---|---|---|
| | 19 | 20 | 21 | 22 | 23 | 24 | 25 | 26 | 27 |
| Wt. % Calcium Lignosulfonate (on gypsum) | 0.15 | 0.20 | 0.15 | 0.25 | 0.15 | 0.30 | 0.15 | 0.35 | 0.15 |
| Wt. % Copolymer of Ex. 1 (on gypsum) | — | — | 0.05 | — | 0.10 | — | 0.15 | — | 0.20 |
| Total Wt. % Dispersant (on gypsum) | 0.15 | 0.20 | 0.20 | 0.25 | 0.25 | 0.30 | 0.30 | 0.35 | 0.35 |
| Consistency (ml H$_2$O/100 g gypsum) | 73 | 73 | 72 | 72 | 70 | 71 | 68 | 70 | 67 |

The results of Tables 4 and 5 together show the unexpected benefit of low consistency when blending into a dispersant formulation the comb/branched copolymer of Example 1 with either of two commonly used gypsum fluidity agents. Incremental addition in an amount greater than or equal to 0.05 wt. % (based on gypsum) of the comb/branched copolymer of Example 1 to 0.15 wt. % (based on gypsum) of naphthalene sulfonate leads to lower consistencies than can be achieved by naphthalene sulfonate alone. For calcium lignosulfonate, incremental addition in an amount greater than 0.10 wt. % (based on gypsum) of the comb/branched copolymer of Example 1 to 0.15 wt. % (based on gypsum) of this commonly used fluidity agent leads to lower consistencies than can be achieved by the calcium lignosulfonate alone.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A gypsum composition suitable for use in the manufacture of construction materials, said gypsum composition comprising:
   a) gypsum;
   b) water; and
   c) a dispersant formulation comprising an acrylic/polyether comb-branched copolymer.

2. The gypsum composition of claim 1 wherein the dispersant formulation is present in an amount effective to decrease the consistency of the gypsum composition relative to the consistency of a similar gypsum composition not containing the effective amount of the dispersant formulation.

3. The gypsum composition of claim 1 wherein the dispersant formulation is present in the gypsum composition in an amount effective to result in the copolymer being present in the gypsum composition in an amount of 0.001 to 1.0 weight percent, based on the total weight of the gypsum composition.

4. The gypsum composition of claim 1 wherein the dispersant formulation further comprises at least one inorganic setting accelerant selected from the group consisting of alkali metal sulfates, alkali earth metal hydroxides, and combinations thereof.

5. The gypsum composition of claim 4 wherein the inorganic setting accelerant comprises sodium sulfate and calcium hydroxide.

6. The gypsum composition of claim 4 wherein the dispersant formulation is present in an amount effective to decrease the consistency and initial set time of the gypsum composition relative to the consistency and initial set time of a similar gypsum composition not containing the effective amount of the dispersant formulation.

7. The gypsum composition of claim 5 wherein the copolymer, sodium sulfate, and calcium hydroxide are present in the dispersant formulation composition in a weight percent, based on the total weight of the gypsum in the gypsum composition, in the following amounts:

| | |
|---|---|
| copolymer | between 0.001 and 1.0 wt. %; |
| sodium sulfate | between 0.01 and 5 wt. %; and |
| calcium hydroxide | between 0.0001 and 0.05 wt. %. |

8. The gypsum composition of claim 1 wherein the pH of the copolymer is between 7 and 12.

9. The gypsum composition of claim 7 wherein the pH of the copolymer is between 7 and 12.

10. The gypsum composition of claim 1 wherein the dispersant formulation also comprises an additive selected from the group consisting of naphthalene sulfonate and calcium containing lignosulfonate.

11. A method of making a gypsum composition suitable for use in the manufacture of construction materials, said method comprising mixing together, in any combination:

a) gypsum;

b) water; and c) a dispersant formulation comprising an acrylic/polyether comb-branched copolymer.

12. The method of claim 11 wherein the dispersant formulation is provided in an amount effective to decrease the consistency of the gypsum composition relative to the consistency of a similar gypsum composition not containing the effective amount of the dispersant formulation.

13. The method of claim 11 wherein the dispersant formulation is provided in the gypsum composition in an amount effective to result in the copolymer being present in the gypsum composition in an amount of 0.001 to 1.0 weight percent, based on the total weight of the gypsum composition.

14. The method of claim 11 wherein the dispersant formulation further comprises at least one inorganic setting accelerant selected from the group consisting of alkali metal sulfates, alkali earth metal hydroxides, and combinations thereof.

15. The method of claim 14 wherein the inorganic setting accelerant comprises sodium sulfate and calcium hydroxide.

16. The method of claim 14 wherein the dispersant formulation is provided in an amount effective to decrease the consistency and initial set time of the gypsum composition relative to the consistency and initial set time of a similar composition not containing the effective amount of the dispersant formulation.

17. The method of claim 15 wherein the copolymer, sodium sulfate, and calcium hydroxide are present in the dispersant formulation in a weight percent, based on the total weight of the gypsum in the gypsum composition, in the following amounts:

| | |
|---|---|
| copolymer | between 0.001 and 1.0 wt. %; |
| sodium sulfate | between 0.01 and 5 wt. %; and |
| calcium hydroxide | between 0.0001 and 0.05 wt. %. |

18. The method of claim 11 wherein the pH of the copolymer is between 7 and 12.

19. The method of claim 17 wherein the pH of the copolymer is between 7 and 12.

20. The method of claim 11 wherein the dispersant formulation also comprises an additive selected from the group consisting of naphthalene sulfonate and calcium containing lignosulfonate.

21. A wallboard comprising:

two sheets of board paper; and a gypsum core between the sheets of board paper, the gypsum core being the set product of the gypsum composition of claim 1.

22. A wallboard comprising:

two sheets of board paper; and a gypsum core between the sheets of board paper, the gypsum core being the set product of the gypsum composition made in accordance with the method of claim 11.

* * * * *